Dec. 28, 1926.

C. A. BODDIE 1,612,351

WATER WHEEL REGULATOR

Filed Nov. 26, 1924    3 Sheets-Sheet 1

WITNESSES:
Carl J. Lousch
J. E. Hardy

INVENTOR
Clarence A. Boddie
BY
Wesley G. Carr
ATTORNEY

Dec. 28, 1926.

C. A. BODDIE 1,612,351

WATER WHEEL REGULATOR

Filed Nov. 26, 1924

WITNESSES:

INVENTOR
Clarence A. Boddie
BY
Wesley L. Carr
ATTORNEY

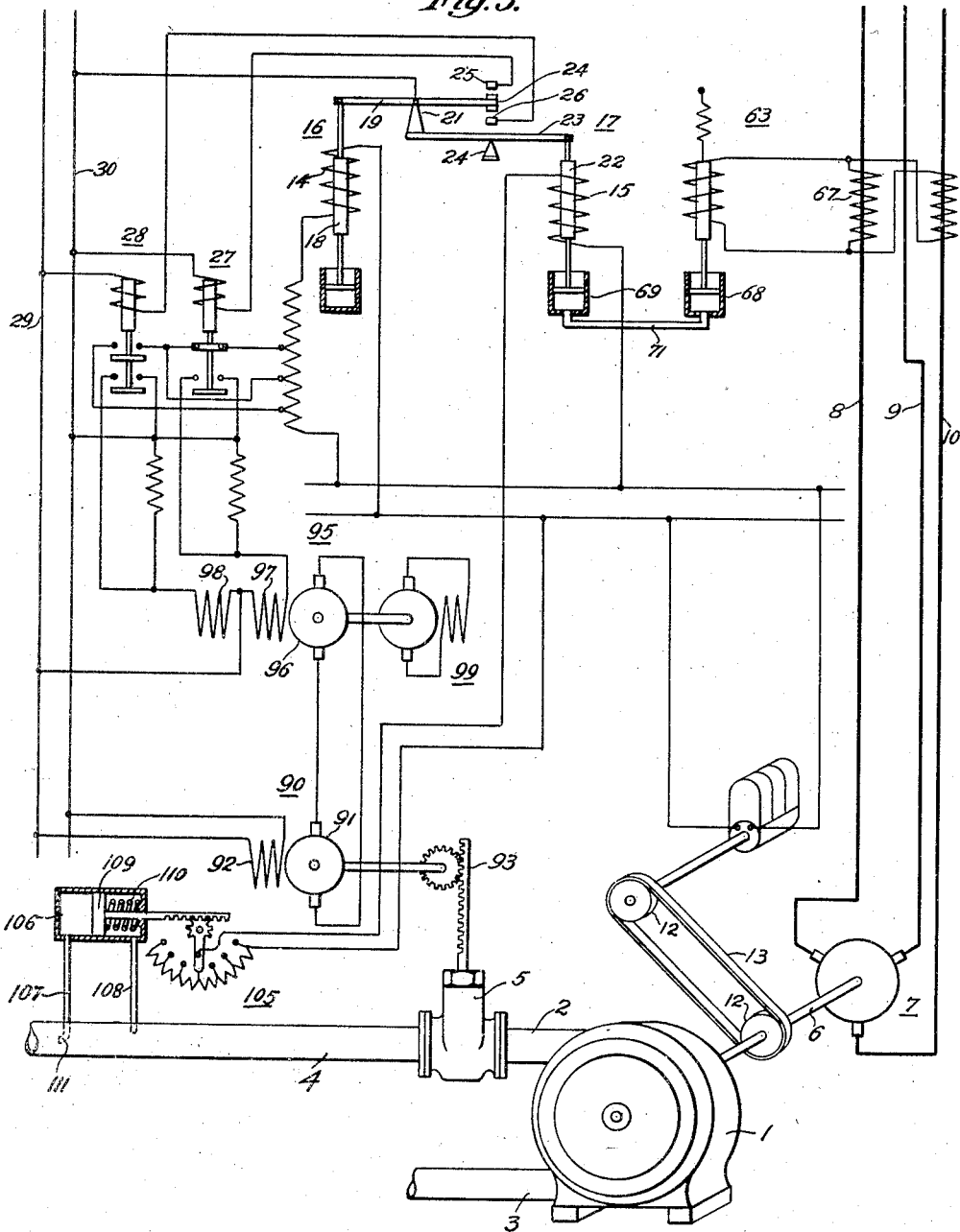

Patented Dec. 28, 1926.

1,612,351

UNITED STATES PATENT OFFICE.

CLARENCE A. BODDIE, OF PITTSBURGH, PENNSYLVANIA, ASSIGNOR TO WESTINGHOUSE ELECTRIC & MANUFACTURING COMPANY, A CORPORATION OF PENNSYLVANIA.

WATER-WHEEL REGULATOR.

Application filed November 26, 1924. Serial No. 752,359.

My invention relates to regulator systems and has special relation to systems for maintaining prime movers at constant speed.

One object of my invention is to provide a regulator system for a prime mover that shall be controlled in accordance with the speed thereof and also in accordance with the load thereupon.

Another object of my invention is to provide a system of the above-indicated character which shall control the admission of fluid to the prime mover and shall have means for reacting upon the controlled mechanism in accordance with the corrective movement of said mechanism.

A further object of my invention is to provide a system of the above-indicated character which shall have means for reacting upon the controlled apparatus in accordance with the pressure of the motive fluid supplied to said prime mover.

The present invention, while applicable to prime movers in general, has been illustrated in connection with a system wherein a water-wheel is utilized as the prime mover, to drive a dynamo-electric machine.

The present invention contemplates providing an electric motor for controlling the movements of the water-wheel gates. This motor is provided with a pair of differentially wound field windings, and means is also provided whereby one of the differential fields of said motor may be independently energized in accordance with variations in the speed of operation of said waterwheel. To accomplish this, electromagnets of the regulator apparatus are energized from a magneto driven from the shaft of the water-wheel. Anti-hunting mechanism is provided in the form of a rheostat connected in series relation with one of said electromagnets the value of the resistance of the rheostat being controlled in accordance with the water-wheel-gate movement.

With the system thus far described, a change in load upon the dynamo-electric machine driven by the water-wheel would not be indicated upon the regulator apparatus until an actual change in speed of the water-wheel occurred. Accordingly, the present invention contemplates providing an additional electromagnet, which is mechanically connected with one of the electromagnets of the regulator apparatus. The auxiliary electromagnet may be energized in accordance with the load of the circuit supplied by the dynamo-electric machine.

In water-wheel plants, it sometimes occurs that the velocity of the water in the penstock is materially increased or decreased from some cause arising in the source of water supply. Such changes in velocity adversely affect the speed of the waterwheel. In order to enable the regulator apparatus to compensate for such changes in velocity, the present invention provides a rheostat which is controlled in accordance with the variations in velocity of the water in the penstock, this rheostat being connected in series circuit relation with one of the electromagnets of the regulator apparatus.

In the accompanying drawings,

Fig. 3 is a diagrammatic illustration of circuits and apparatus embodying a modification of the system of Fig. 2.

Figure 1:
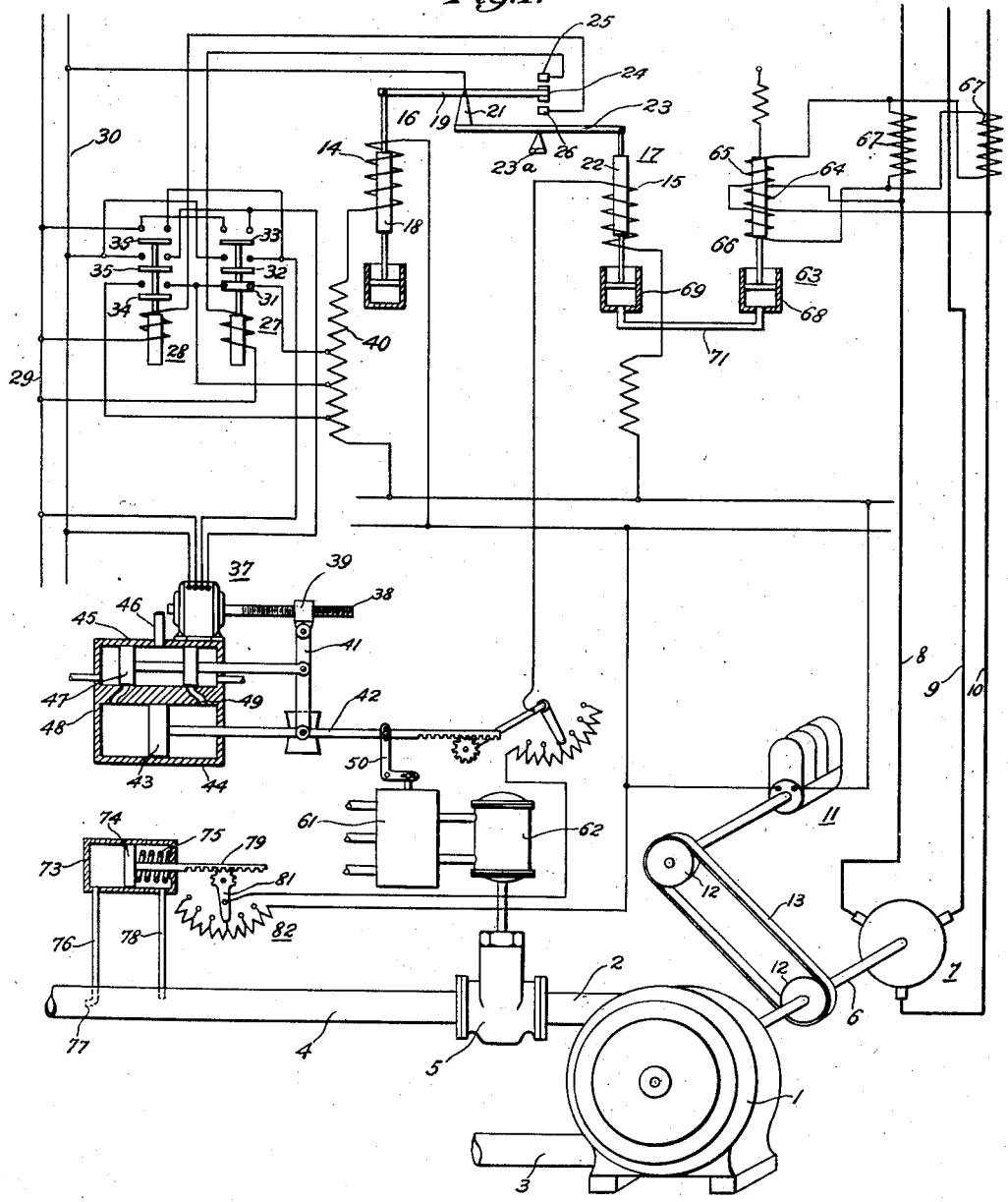
Figure 1 is a diagrammatic illustration of circuits and apparatus embodying my invention, illustrating a fluid-pressure control system for the water-wheel gate mechanism.

Referring to Fig. 1, a water-wheel having an inlet 2 and an outlet 3, has a penstock 4 connected thereto. The gate valve 5, of wellknown construction, controls the water flowing from the penstock to the water-wheel. Mounted upon the shaft 6 of the water-wheel is a dynamo-electric machine 7, supplying conductors 8, 9, and 10. A magneto generator 11 is also driven from the shaft 6 of the water-wheel through pulleys 12 and belt 13. The magneto 11 operates in accordance with the speed of the water-wheel and, therefore, the voltage of the magneto generator is an indication of the water-wheel speed.

The coils 14 and 15 of electromagnets 16 and 17 are adapted to be energized by the generator 11. Electromagnets 16 and 17 comprise the main control magnets of the regulator apparatus for controlling the operation of the gate valve 5. Electromagnet 16 has a core armature 18 which is pivotally connected to a lever 19 that is pivotally supported at 21. Electromagnet 17 has a core armature 22, pivotally connected to a lever 23 that is pivotally supported at 23ª. The lever 23 carries the pivot 21 for the lever 19. The lever 19 has a contact member 24 mounted thereon, which selectively engages contact members 25 and 26. Contact member 25 is in circuit with the operating coil of an electromagnetic switch 27, and contact member 26 is in circuit with the operating coil of an electromagnetic switch 28. The other terminal of the operating coils of switches 27 and 28 are respectively connected to conductor 29. The contact lever arm 19 is connected to the conductor 30.

The electromagnetic switch 27 controls contact members 31, 32 and 33. The electromagnetic switch 28 controls contact members 34, 35 and 36. The electromagnetic switches 27 and 28 constitute reversing switches which control the differential fields of an electric motor 37, in a well-known manner. The contact members 31 and 34 operate to insert a portion of the resistor 40 in series with the coil 14, or to short circuit a portion thereof, upon operation of the reversing switch 27, in the one case, and the switch 28 in the other, to operate as an anti-hunting means for the regulator.

The motor 37 controls a worm screw 38 which operates a traveling nut 39. Pivotally connected to the nut 39 is a floating lever 41 which is pivotally connected, at its other end, to the rod 42. The rod 42 is connected to a piston 43 which is within an operating cylinder 44. Fluid, under pressure, is admitted to the cylinder 44 from the valve casing 45, through ports 48 and 49 communicating with the cylinder 44 on opposite sides of the piston 43 in accordance with the operation of the valve pistons 47. The valve casing is provided with an inlet port 46 which supplies fluid, through the ports 48 and 49, to the cylinder 44. The rod 42 is connected, at one end, to the bell-crank lever 50.

The connection of the valve pistons 47 to the floating lever 41 causes the pistons to be moved, in accordance with the motion of the rod 42, to close or to tend to close, the port through which the fluid is entering the cylinder 44. It will be seen, therefore, that this connection operates as an anti-hunting device for the valve 47. In this manner, the movements of the pilot valve 61 are controlled to raise or lower the relay valve 62, directly connected to the gate mechanism 5.

In order that the regulator mechanism may be actuated, in accordance with variations in load upon the dynamo-electric machine 7, to correct for such variations prior to an actual variation in speed of the water-wheel 1, an auxiliary electromagnet 63 is provided. The electromagnet 63 comprises a centrally-disposed polarizing winding 64 and two differential windings 65 and 66, energized from series transformers 67, located in the supply circuit 8, 9 and 10 supplied from the dynamo-electric machine 7. A dash-pot cooperates with the magnet 63 and is interconnected, by means of a pipe 71, to dash-pot 69 which cooperates with the control magnet 17. Variations in load upon the supply circuit 8, 9 and 10 will actuate the magnet 63 to act upon the core 22 of electromagnet 17, through the fluid connection, and thereby initiate the operation of the regulator apparatus, thus varying the water pressure supplied to the water-wheel in order to compensate for such load variation.

As heretofore explained, variations in the velocity of the water supplied to the water-wheel sometimes occur and adversely affect the speed of the water-wheel. In order to anticipate the effects of such changes in velocity, and to operate the gate mechanism to compensate therefor, a pressure-device is provided, such device comprising a cylinder 73, having a piston 74 therein which acts against a spring 75. A pipe 76, having a curved end 77 located within the penstock, communicates with the cylinder 73 on the side of the piston 74 opposite to that on which the spring 75 is located. A pipe 78 extends within the penstock 4 and communicates with the cylinder 73 on the same side of the piston 74 that the spring 75 is located. Variations in the velocity of the water in the penstock will actuate the piston 74 and move the rack 79. The rack 79 controls the rheostat arm 81 of rheostat 82 which is in series-circuit relation with the winding 15 of the regulator control magnet 17.

Accordingly, the variation of the resistance in the circuit of this magnet will increase or decrease the pull upon the control magnet 17 to unbalance the regulator, and initiate the operation of the gate mechanism to correct for such variations prior to an actual change in speed of the water-wheel. It will be seen, therefore, that the rheostat 82 operates as an anti-hunting device for the regulator.

Figure 2:
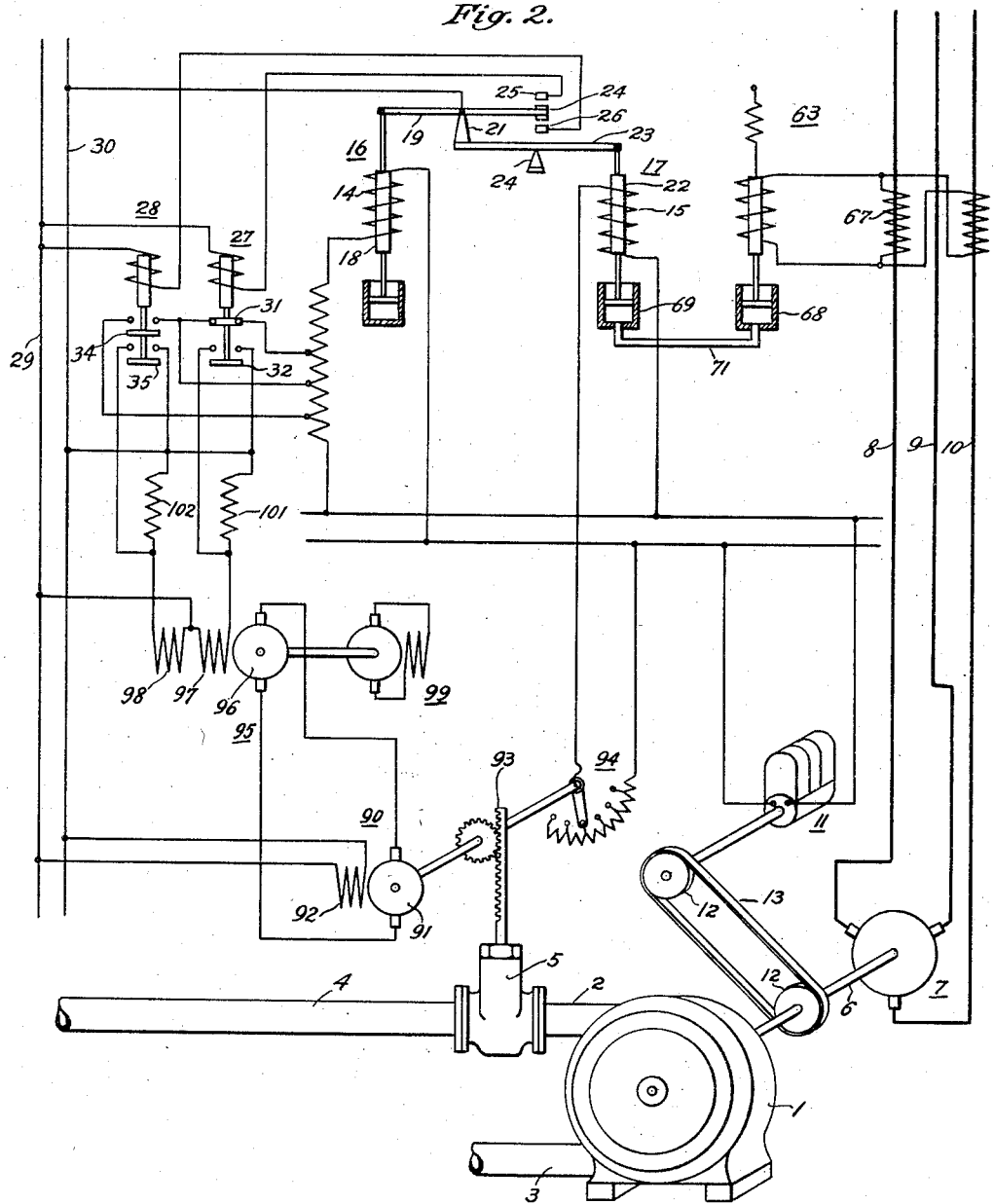
Fig. 2 is a diagrammatic illustration of circuits and apparatus embodying my invention, illustrating electrical control of the water-wheel gate mechanism.

Referring to Fig. 2, the duplicated parts of the system of Fig. 1 are given the same reference numerals.

In the system of Fig. 2 the gate mechanism 5 is adapted to be raised and lowered by the operation of an electric motor 90, comprising an armature 91 and a field-magnet winding 92, through rack-and-pinion mechanism 93. The operation of the motor 90 also controls the arm of a rheostat 94 which is connected in series circuit relation with the coil of electromagnet 17.

The motor 90 may be energized from the generator 95, comprising an armature 96 and differential field-magnet windings 97 and 98. The generator 95 is operated by an electric motor 99. In the system of Fig. 2, the reversing switches 27 and 28 respectively control shunt circuits about the resistors 101 and 102 which are respectively included in circuit with the field-magnet windings 97 and 98. When the switch 27 is operated, the resistor 101 is shunted and the energization of field-magnet winding 97 predominates to operate the motor 90 in one direction to correspondingly operate the gate mechanism. When the reversing switch 28 is operated, the resistor 102, in circuit with the field-magnet winding 98 will be shunted, and this will cause the motor 90 to be operated in the opposite direction. The operation of the regulator mechanism, in accordance with variations in load upon the dynamo-electric machine, is the same as that of the modification illustrated in Fig. 1, and already described excepting that the load coil 63 is illustrated as being energized by the load current only.

The system of Fig. 3 is similar to that of Fig. 2, except that, in the system of Fig. 3, there is no reaction in accordance with the gate movement, but the system includes a rheostat 105, the arm of which is operated from a cylinder 106 in accordance with variations in velocity of the water in the penstock, as communicated to the cylinder 106 through pipes 107 and 108. The pipes 107 and 108 communicate with the cylinder 106 on the opposite sides of a piston 109, which bears against a spring 110. The pipe 107 has a curved end 111 within the penstock, and, therefore, conveys to the cylinder 106 variations in velocity pressure of the water. The pipe 108 does not have a curved end and, accordingly, the pressure communicated therethrough to the cylinder 106 will be the static pressure combined with the pressure within the penstock, and this pressure of the spring 110, will act against the velocity pressure.

The effect upon the regulator apparatus is similar to the effect of the rheostat 82, heretofore described in connection with Fig. 1, since the rheostat 105 is in series circuit relation with the electromagnet 17 of the regulator apparatus. It is not believed that a more detailed description of the systems of Figs. 2 and 3 need be given, in view of the foregoing description of the system shown in Fig. 1.

Other modifications of the system and arrangement and location of parts may be made without departing from the spirit and scope of my invention, and such modifications are intended to be covered by the appended claims.

I claim as my invention:

1. In a system of regulation, the combination with a prime mover, control means for controlling the supply of motive fluid thereto, a dynamo-electric machine driven thereby, electroresponsive regulator means adapted to be energized in accordance with the speed of said prime mover, and means controlled by the regulator means for governing the operation of said control means to correct for variations in the speed of the prime mover, means actuated in accordance with the operation of said control means to react upon said regulator mechanism to influence the same, means mechanically connected to said regulator means and adapted to actuate the same in accordance with variations in load upon the dynamo-electric machine, means connected in circuit with said regulator apparatus to vary the operation of the same, and means for actuating said last named means in accordance with variations in the velocity of the motive fluid supplied to said prime mover.

2. In a system of regulation, the combination with a prime mover, control means for controlling the supply of motive fluid thereto, a dynamo-electric machine driven thereby, regulator means adapted to be energized in accordance with the speed of said prime mover, and means controlled by said regulator means for governing the operation of said control means to correct for variations in the speed of the prime mover, means actuated in accordance with the operation of said control means to react upon said regulator mechanism, means mechanically connected to said regulator apparatus and adapted to actuate the same in accordance with variations in load upon the dynamo-electric machine, means connected in circuit with said regulator apparatus to vary the operation of the same and means for actuating said last named means in accordance with variations in the velocity of the motive fluid supplied to said prime mover, and anti-hunting means responsive to the action of said control means.

3. In a regulator system, the combination with a water-wheel, control means for controlling the admission of water thereto, means adapted to operate said control means, of regulator means actuated in accordance with the speed of said water-wheel, comprising two electromagnets respectively controlling a pivoted lever, reversing switches selectively energized in accordance with the operation of said lever, said reversing switches controlling the operation of said control means and also varying the energization of one of said electromagnets to oppose the action thereof, means co-operating with one of said electromagnets and actuated in accordance with the variations in load upon said dynamo-electric machines and adapted to influence the operation of said regulator apparatus in accordance with such load variations, means also connected in circuit with one of said electromagnets to modify the action of the regulator, and means also in circuit with one of said electromagnets and provided with control means actuated in accordance with the velocity of the water supplied to said water wheel.

4. In a regulator system, the combination with a water-wheel, control means for controlling the admission of water thereto, of regulator means actuated in accordance with the speed of said water-wheel, comprising two electromagnets respectively controlling a pivoted lever, reversing switches selectively energized in accordance with the operation of said lever, said reversing switches controlling the operation of said control means and also varying the setting of one of said electromagnets to anticipate the resetting thereof, means co-operating with one of said electromagnets and actuated in accordance with the variations in load upon said dynamo-electric machine to influence the operation of said regulator in accordance with said load variations, means also connected in circuit with one of said electromagnets to modify the action of said regulator, and means also in circuit with one of said electromagnets and provided with control means actuated in accordance with the velocity of the water supplied to said water-wheel.

5. In a system of regulation, the combination with a prime mover, control means for controlling the supply of motive fluid thereto, a dynamo-electric machine driven thereby, electroresponsive regulator means adapted to be energized in accordance with the speed of said prime mover, and means controlled by the regulator means for controlling the operation of said control means to correct for variations in the speed of the prime mover, means mechanically connected to said regulator means and adapted to actuate the same in accordance with variations in load upon the dynamo-electric machine, and means connected in circuit with said regulator apparatus and provided with control means to vary the operation of the same in accordance with variations in the velocity of the motive fluid supplied to said prime mover.

6. In a system of regulation, the combination with a prime mover, control means for controlling the supply of motive fluid thereto, a dynamo-electric machine driven thereby, regulator means adapted to be energized in accordance with the speed of said prime mover, and means controlled by said regulator means for governing the operation of said control means to correct for variations in the speed of the prime mover, means mechanically connected to said regulator apparatus and adapted to actuate the same in accordance with variations in load upon the dynamo-electric machine, means connected in circuit with said regulator apparatus to vary the operation of the same in accordance with variations in the velocity of the motive fluid supplied to said prime mover, actuating means therefor, and anti-hunting means responsive to the action of said control means.

7. In a regulator system, the combination with a water-wheel, control means for controlling the admission of water thereto, means adapted to operate said control means, of regulator means actuated in accordance with the speed of said water-wheel, comprising two electromagnets respectively controlling a pivoted lever, means cooperating with one of said electromagnets and actuated in accordance with the variations in load upon said dynamo-electric machines to influence the operation of said regulator apparatus in accordance with such load variation, means also connected in circuit with one of said electromagnets to modify the action of the regulator, and means also in circuit with one of said electromagnets and provided with operating means actuated in accordance with the velocity of the water supplied to said water-wheel.

8. In a regulator system, the combination with a water-wheel, control means for controlling the admission of water thereto, of regulator means actuated in accordance with the speed of said water-wheel, comprising two electromagnets respectively controlling a pivoted lever, reversing switches selectively energized in accordance with the operation of said lever, said reversing switches controlling the operation of said control means and also varying the setting of one of said electromagnets to anticipate the resetting thereof, means also connected in circuit with one of said electromagnets to modify the action of said regulator, and means also in circuit with one of said electromagnets and provided with operating means actuated in accordance with the velocity of the water supplied to said water-wheel.

9. In a system of regulation, the combination with a prime mover, control means for controlling the supply of motive fluid theerto, a dynamo-electric machine driven thereby, electroresponsive-regulator means adapted to be energized in accordance with the speed of said prime mover, and means controlled by the regulator means for controlling the operation of said control means to correct for variations in the speed of the prime mover, and means connected in circuit with said regulator means to vary the operation of the same provided with operating means actuated in accordance with variations in the velocity of the motive fluid supplied to said prime mover.

10. In a system of regulation, the combination with a prime mover, means for controlling the supply of motive fluid thereto, a dynamo-electric machine driven thereby, means operated in accordance with the speed of said prime mover, regulator apparatus adapted to be energized in accordance with the speed of said prime mover, and means controlled by the regulator apparatus for controlling the operation of said control means to correct for variations in the speed of the prime mover, means connected in circuit with said regulator apparatus to vary the operation of the same, means for governing said last named means actuated in accordance with variations in the velocity of the motive fluid supplied to said prime mover, and anti-hunting means responsive to the action of said control means.

11. In a regulator system, the combination with a water-wheel, control means for controlling the admission of water thereto-means adapted to operate said control means, of regulator means actuated in accordance with the speed of said water-wheel, comprising a pivoted lever and two electromagnets respectively controlling said pivoted lever, means connected in circuit with one of said electromagnets to modify the action of the regulator, and means also in circuit with one of said electromagnets and provided with control means actuated in accordance with the velocity of the water supplied to said water-wheel.

12. In a regulator system, the combination with a water-wheel, control means for controlling the admission of water thereto, of regulator means actuated in accordance with the speed of said water-wheel comprising a pivoted lever and two electromagnets respectively controlling said pivoted lever, reversing switches selectively energized in accordance with the operation of said lever, said reversing switches controlling the operation of said control means and also varying the setting of one of said electromagnets to anticipate the resetting thereof, and means in circuit with one of said electromagnets and provided with control means actuated in accordance with the velocity of the water supplied to said water-wheel.

In testimony whereof, I have hereunto subscribed my name this 20th day of November 1924.

CLARENCE A. BODDIE.